United States Patent [19]

Chodosh

[11] Patent Number: 4,607,770
[45] Date of Patent: Aug. 26, 1986

[54] HEAT TREATMENT OF FABRICS AND OTHER SHEET MATERIAL

[75] Inventor: Edward Chodosh, London, United Kingdom

[73] Assignee: Wayne Chodosh, London, United Kingdom

[21] Appl. No.: 743,937

[22] Filed: Jun. 12, 1985

[30] Foreign Application Priority Data

Apr. 18, 1985 [GB] United Kingdom ............... 8509980

[51] Int. Cl.$^4$ ............................................ A41H 43/00
[52] U.S. Cl. ................................... 223/28; 223/34
[58] Field of Search ................. 223/28, 32, 34; 2/211; 38/44, 52

[56] References Cited

U.S. PATENT DOCUMENTS

| | | | |
|---|---|---|---|
| 2,817,468 | 12/1957 | Brown | 223/28 X |
| 2,821,237 | 1/1958 | Howard | 223/28 |
| 3,348,458 | 10/1967 | Tipper | 223/28 X |
| 4,198,202 | 4/1980 | Kleber | 2/211 X |

*Primary Examiner*—Louis K. Rimrodt
*Attorney, Agent, or Firm*—Merchant, Gould, Smith, Edell, Welter & Schmidt

[57] ABSTRACT

Apparatus and methods of heat-treating laminar materials, in particular fabrics including materials such as synthetic leather (laminated polyurethane) are disclosed. The apparatus comprises a pair of cooperating rollers defining a nip through which the material is passed. Heating means is arranged to heat the material as it is compressed at the roller nip. A feeding arrangement is provided for feeding the material to said nip, the feeding arrangement including a pair of cooperating formers between which the material is passed. Each of the formers comprises a series of ribs spaced apart from one another, the average gap between adjacent ribs being less at the leading edge of the former than at the trailing edge thereof. The ribs of one former are positioned so that they are able to lie within the gaps between the ribs of the other former. Advantageously, the apparatus also includes means for effecting lateral movement of at least one of the formers. This enables the treated material to have a pseudo-regular repeat pattern of overlapping portions. By adjusting the rate of lateral movement of the formers, the rate of throughput through the roller nip and the temperature at the roller nip, a wide variety of decorative surface textures may be provided in a wide range of materials. A print paper may be included with the material passing through the apparatus so as to produce colored as well as textured effects.

14 Claims, 5 Drawing Figures

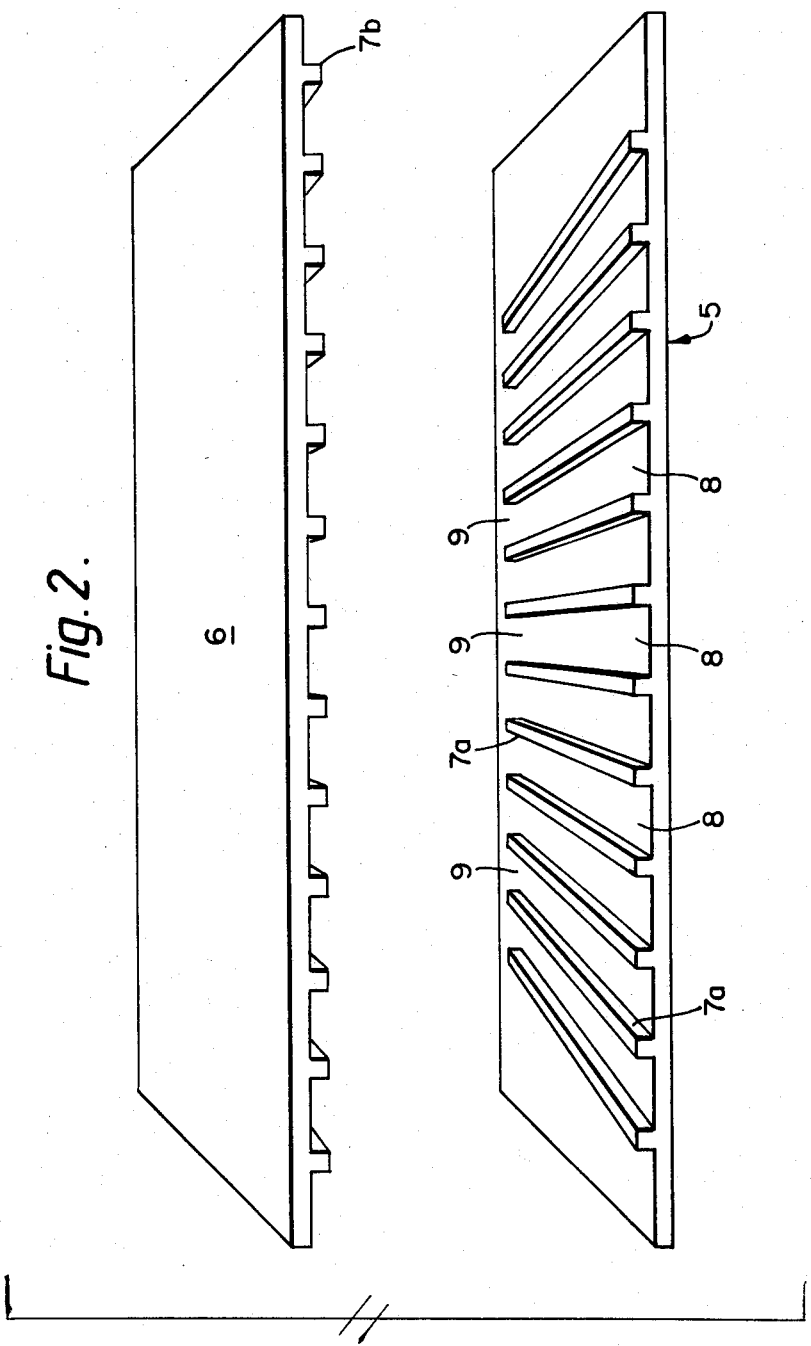

HEAT TREATMENT OF FABRICS AND OTHER SHEET MATERIAL

This invention relates to the heat-treatment of fabrics and similar sheet material with a view to imparting a decorative surface texture to the material. The invention is applicable to conventional fabrics as used in the manufacture of garments such as skirts and dresses, and also to fabrics such as synthetic leather as used particularly in the manufacture of fashion boots, shoes and handbags.

It is important to differentiate the present invention from conventional pleating apparatus and methods. In conventional pleating, a web of material is fed between a pair of cooperating rollers which define between them a nip. Immediately upstream of the nip there are a series of pleating knives which fold the cloth in the direction of movement of the web of material to create the pleats which are then made permanent by the heat and pressure applied in the roller nip. The folding, accordingly is transverse to the direction of movement of material through the rollers. Consequently, a material of given width before pleating is of the same width after pleating, but its length is reduced according to the tuck ratio of the applied pleats. In contrast, the present invention does not require the use of pleating knives. Furthermore, the material after passing through the roller nip is reduced in width but not reduced in length. There is no need to employ moving elements located tight up against the roller nip, as is needed in conventional pleating.

More particularly, according to one aspect of the present invention, there is provided an apparatus for heat-treating a laminar material, which apparatus comprises a pair of co-operating rollers defining between them a nip through which the material to be treated can be passed; first means for heating the material and second means for holding the rollers together under pressure such that, in use, material passing through said nip is simultaneously heated and compressed; and a feeding arrangement for feeding the material to said nip, characterised in that the feeding arrangement includes a pair of co-operating formers between which the material is passed, each of the formers comprising a series of ribs spaced apart from one another, the average gap between adjacent ribs being less at that edge of each of the formers adjacent to said nip than at that edge of each of the formers remote from said nip, and the ribs of one former being positioned so that, in use, they are able to lie within the gaps between the ribs of the other former. The invention also provides material heat-treated in the apparatus as defined above and garments fabricated from such material.

Advantageously, the ribs of the two formers are arranged in a truncated radial configuration, converging towards the nip between the rollers. In their simplest form of construction, the ribs of each of the formers are linear. This is not essential, however, provided that the ribs of one former can fit into the gaps between the ribs of the other former. Conveniently, the apparatus further includes a support surface, e.g. a tray or platten, for the formers. The apparatus will generally be arranged so that there is a gap of a few inches between that edge of the pair of formers closest to the roller nip and the roller nip itself. The pressure and heat applied in the roller nip will generally be selected to be sufficient to make permanent the folding which results from the material passing between the formers.

The apparatus defined above can be used to generate a pseudo-random creasing effect in the surface of material passed through the apparatus. The formers act to hold the material in a folded configuration which is only partly maintained at the time when the material enters the nip; consequently the folding in the treated material lacks the regularity associated with conventional pleating.

In one embodiment of the invention, a print paper (transfer) is passed through the roller nip simultaneously with the material being treated. The effect of heat and pressure in the region of the nip transfers colour from the print paper onto the exposed surface regions of the material. With this arrangement, the finished product, in the unstretched or relaxed condition, displays the colour of the print paper while when it is stretched laterally with respect to the direction of movement of material through the apparatus, the material displays self-colour as well as the colour of the print paper. The regions of self-colour are those regions of the material which were concealed by folding during their passage through the roller nip.

In a further advantageous development of the apparatus of this invention, there is additionally provided means for effecting lateral movement of at least one of the formers during operation of the apparatus. Preferably, such apparatus includes a cam acting against one of the two formers and biassing means acting to hold the edge of said one former against the cam surface. Preferably, the apparatus includes a variable speed motor for rotating this cam. Generally, the means for effecting lateral movement of one of the formers will act against the lower of the two formers. With such an arrangement, the upper of the two formers may be free to move with the lower former. A variety of cam shapes and of configurations for the two formers may be adopted; it will be appreciated that variations such as these will result in a corresponding variety of different surface textures when material is heat-treated in the apparatus.

Where the apparatus includes means for effecting lateral movement of at least one of the formers, the resultant texture of a material treated in the apparatus has a pseudo-regular repeat pattern, although there will often be small differences in folding detail between similar sections of the treated material.

In general, the rollers of the apparatus will be connected to a variable speed drive means. Where the apparatus includes means for effecting lateral movement of at least one of the formers, different surface texture effects may be achieved by altering the ratio between the roller drive speed (which determines the rate of throughput of material) and the frequency of lateral movement applied to said one of the formers.

Said first means for heating the fabric can advantageously be incorporated in one of the two cooperating rollers. To this end, a conventional heated roller such as is used in an automatic pleating machine may be employed. Conventional pleating knives and their associated drive mechanism are not required. Alternatively, both of the rollers may be provided with internal heating means. Since the temperature tolerance of materials varies over a considerable range, the apparatus will generally include means for controlling the temperature at the roller nip.

The dimensions of the ribs which constitute the formers, and their spacing from one another, will affect the resultant surface texture of the material being treated. In general, satisfactory effects will be obtained on light fabrics if the ribs are relatively narrow and have relatively wide gaps between them. With heavier fabrics and in particular with polyurethane laminates such as are used to simulate leather, the formers can be relatively wide with only small gaps between them; in such an arrangement, the material is held relatively tightly within the formers since there will be only limited free space when the ribs of the upper former come to lie in the gaps between the ribs of the lower former.

When laminated polyurethane material (synthetic leather) is treated in an apparatus of the present invention, different effects may be achieved by varying the temperature at the roller nip. With relatively high temperatures, the folded surface regions of polyurethane material are welded onto one another; at lower temperatures, the folded polyurethane does not weld, and thus the treated material can be stretched laterally to expose the under-folded regions. This cannot be done in the case where surface welding has occurred.

It will be appreciated that apparatus in accordance with the presence invention provides a versatile way of achieving a wide variety of different decorative textures in a range of materials.

According to a second aspect of the present invention, there is provided a method for heat-treating a laminar material, in which the material is passed through a pair of cooperating rollers defining between them a nip, characterised in that the material is passed through a feeding arrangement upstream of the roller nip, which feeding arrangement comprises a pair of cooperating formers each comprising a series of ribs spaced apart from one another, the average gap between adjacent ribs being less at that edge of each of the formers adjacent to said nip than at that edge of each of the formers remote from said nip; in that the ribs of one former are maintained in a position such that they lie within the gaps between the ribs of the other former; and in that the conditions acting on the material at said roller nip are selected so as to make permanent the creases applied to the material by the action of said formers.

Advantageously, at least one of the formers is moved laterally with respect to the direction of travel of the material in the method of this invention.

The invention will now be illustrated by reference to the accompanying drawings, in which:

FIG. 2 shows a perspective view of one pair of formers for use in the apparatus of this invention;

Figure 1:
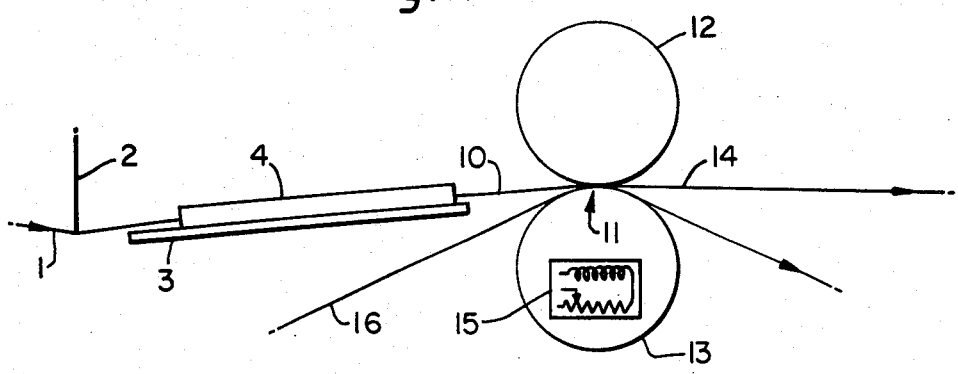
FIG. 1 illustrates schematically the mode of operation of one embodiment of the invention.
Figure 3:
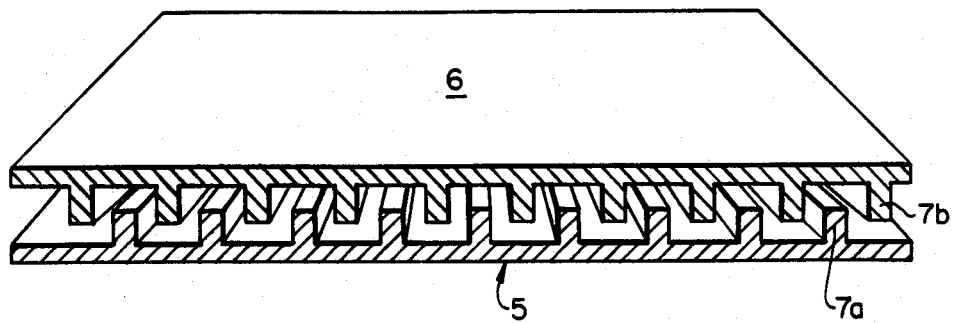
FIGS. 3 and 4 show perspective views of two other formers for use in the apparatus of the invention.
Figure 4:
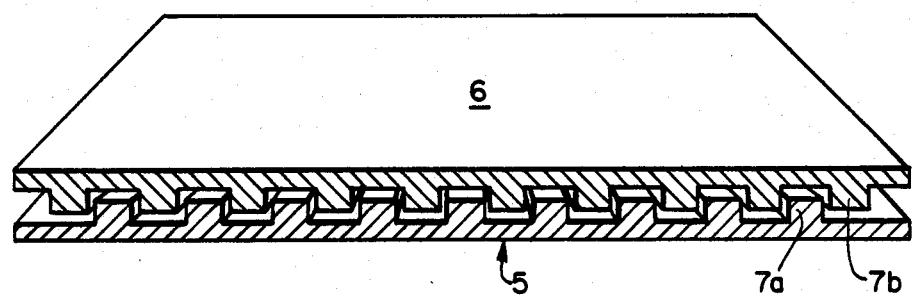

Referring now to FIG. 1 of the drawings, a sheet of material to be treated is supplied as shown at 1 from a roll (not shown). A weight 2 in the form of a laminar sheet having an arcuate bottom surface rests against the material 1 in order to hold it under tension. After passing beneath weight 2, the material travels over a platten 3 and between a pair of formers 4. As shown in FIGS. 2, 3 and 4, the lower former 5 and the upper former 6 are each provided with a plurality of ribs 7a and 7b disposed so that, when formers 5 and 6 are held together (as shown in FIGS. 3 and 4), ribs 7b lie within the gaps between ribs 7a. It will also be seen from FIG. 2 that the ribs in this embodiment are linear and are arranged in a truncated radial fashion, so that the gaps 8 (along that edge of the formers closest to weight 2) are larger than the gaps 9 (at that edge of the formers remote from weight 2). As shown schematically in FIG. 1, the material passes between the pair of formers and emerges at 10. It then passes through the nip 11 defined between a pair of co-operating rollers 12 and 13. Lower roller 13 is provided with internal heating means (indicated diagrammatically at 15) which can be adjusted to set a predetermined temperature. Roller 13 is coated with a layer of protective felt (not shown). Upper roller 12 is in this embodiment a conventional metal roller and is urged into contact with lower roller 13 by adjustable pressure mountings (not shown). After passing through nip 11, the treated material emerges at 14 and is passed to a take-up roller (not shown).

Also passing through nip 11 between rollers 12 and 13 there is a print paper 16 which carries, on its upper surface, a heat-transferable dye. The effect of heat and pressure in nip 11 transfers dye onto the surface of the material undergoing treatment so that when it emerges at 14, those parts of the material which have been in contact with print paper 16 will have been coloured by the dye transfer operation. The heat and pressure experienced by the material in the nip 11 also renders permanent the folding of the material.

There is a small distance between roller nip 11 and the forward edge of formers 4; for ease of illustration in FIG. 1, this distance has been exaggerated relative to the dimensions of formers 4.

The formers shown in FIGS. 3 and 4 are generally similar to those shown in FIG. 2 except that the dimensions of ribs 7a and 7b and of gaps 8 and 9 have been varied. In FIG. 2, the ribs are narrow and the gaps between adjacent ribs are relatively large; in FIG. 3, the ribs are wider and the gaps between them correspondingly smaller, while this trend is even more exaggerated in FIG. 4, where the gaps between adjacent ribs are just sufficient so that, when formers 5 and 6 are held together as illustrated, they fit relatively closely with only limited space between them for the material which is being treated. By way of example, ribs 7a and 7b such as shown in FIG. 2 may be approximately two centimeters high and 0.5 cm wide, with gaps 8 being approximately 3.5 cm and gaps 9 approximately 2 cm; and ribs 7a and 7b as shown in FIG. 4 may be approximately 1.5 cm high and 2 cm wide, with gaps 8 being approximately 4.5 cm and gaps 9 approximately 2.5 cm. Formers such as shown in FIG. 4 are useful in the treatment of relatively heavy materials such as laminated polyurethane fabric which is used as synthetic leather. The more widely spaced ribs such as illustrated in FIG. 2 find application in the treatment of light fabrics such as are used for ladies fashion garments.

Figure 5:
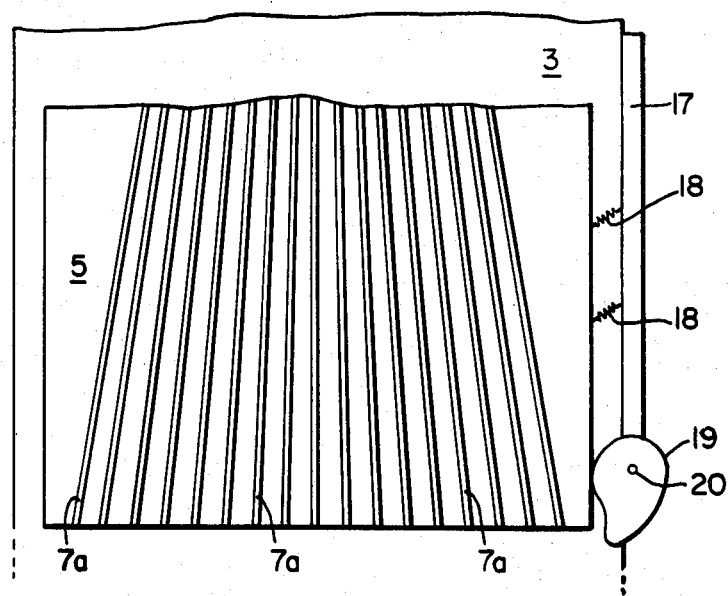
FIG. 5 illustrates in schematic plan view of part of a preferred embodiment of the invention.

FIG. 5 illustrates a preferred embodiment of the invention which introduces one further element of versatility into the treatment of material. In FIG. 5, there is shown a schematic plan view of part of the apparatus of FIG. 1, incorporating additional integers. For ease of illustration, the upper former 6 has been omitted from FIG. 5. In this illustrated embodiment, the platten 3 carries a guide rail 17 which is connected to the right hand edge of lower former 5 by two tension springs 18. Also acting on the right hand edge of former 5 is a cam 19 which is rotated about axis 20 by a variable speed motor (not shown). Cam 19 acts to push the pair of formers 4 laterally with respect to the direction of movement of material through the apparatus. Tension springs 18 ensure that the right hand edge of lower former 5 remains in contact with cam 19. The springs 18 are mounted close to the point of action of cam 19 on former 5.

The illustrated apparatus may be used to generate a variety of attractive surface textures in a range of materials, including heavy fabrics such as polyurethane laminates which are used in the manufacture of fashion boots. The embodiment of FIG. 5 is particularly useful in this connection.

I claim:

1. Apparatus for heat-treating a laminar material, which apparatus having a pair of co-operating rollers defining between them a nip through which the material to be treated can be passed in a direction of travel; first means for heating the material and second means for holding the rollers together under pressure such that, in use, material passing through said nip is simultaneously heated and compressed; and a feeding arrangement for feeding the material to said nip comprising a pair of co-operating formers between which the material is passed in said direction, each of the formers comprising a series of ribs spaced apart from one another, the average gap between adjacent ribs being less at an edge of each of the formers adjacent to said nip than at an edge of each of the formers remote from said nip, the ribs of one of said formers disposed to lie within gaps defined between opposing ribs of the other of said formers and lateral movement means for effecting movement of at least one of said formers in a direction lateral to said direction of travel during operation of said apparatus.

2. Apparatus as claimed in claim 1, wherein the ribs of said two formers are arranged in a truncated radial configuration, converging towards the nip between said rollers.

3. Apparatus as claimed in claim 2, wherein the ribs of each of said formers are linear.

4. Apparatus as claimed in claim 1, which further includes a support surface for said two formers.

5. Apparatus as claimed in claim 1, wherein the rollers and said two formers are disposed so that there is a gap of a few inches between the leading edge of the pair of formers and said nip.

6. Apparatus as claimed in claim 1, wherein said lateral movement means includes a cam acting against one of said two formers, and biassing means acting to hold the edge of said one former against the cam surface.

7. Apparatus as claimed in claim 6, which further includes variable speed motor means for rotating said cam.

8. Apparatus as claimed in claim 1, wherein said lateral movement means is arranged to act against the lower of said two formers.

9. Apparatus as claimed in claim 8, wherein the upper of said two formers is free from constraints to lateral movement so that it is able to move with said lower former.

10. Apparatus as claimed in claim 1, wherein said first means for heating the material is located in one of said two cooperating rollers.

11. Apparatus as claimed in claim 10, wherein there is provided means for controlling the temperature at the roller nip during operation of the apparatus.

12. Apparatus as claimed in claim 1, which further includes a plurality of sets of formers, the sets differing in the dimensions of the ribs of the formers and in the spacing of said ribs from one another.

13. Apparatus as claimed in claim 12, wherein one of said sets of formers is such that material is held tightly between the two formers.

14. A method for heat-treating a laminar material, comprising passing said material in a direction of travel through a pair of cooperating rollers defining between them a nip, characterised by passing said material through a feeding arrangement upstream of the roller nip, which feeding arrangement comprises a pair of cooperating formers each comprising a series of ribs spaced apart from one another, the average gap between adjacent ribs being less at that edge of each of the formers adjacent to said nip than at that edge of each of the formers remote from said nip; in that the ribs of one former are maintained in a position such that they lie within the gaps between the ribs of the other former; moving at least one of said formers in a direction lateral to said direction of travel to vary a resultant surface texture of said material and making said resultant surface texture permanent by passing said material through said nip.

* * * * *